United States Patent [19]
Torng et al.

[11] Patent Number: 5,764,445
[45] Date of Patent: Jun. 9, 1998

[54] EXCHANGE BIASED MAGNETORESISTIVE TRANSDUCER

[75] Inventors: Chyu Jiuh Torng, Santa Barbara, Calif.; Chiharu Mitsumata, Tokyo, Japan

[73] Assignee: Applied Magnetics Corporation, Goleta, Calif.

[21] Appl. No.: 460,213

[22] Filed: Jun. 2, 1995

[51] Int. Cl.$^6$ ........................................ G11B 5/39
[52] U.S. Cl. ........................................ 360/113
[58] Field of Search ........................... 360/113, 125, 360/126; 324/252; 338/32 R

[56] References Cited

U.S. PATENT DOCUMENTS

| | | | |
|---|---|---|---|
| 4,103,315 | 7/1978 | Hempstead et al. | 360/113 |
| 4,755,897 | 7/1988 | Howard | 360/113 |
| 4,825,325 | 4/1989 | Howard | 360/113 |
| 5,014,147 | 5/1991 | Parkin et al. | 360/113 |
| 5,315,468 | 5/1994 | Lin et al. | 360/113 |
| 5,373,238 | 12/1994 | McGuire et al. | 324/252 |
| 5,436,777 | 7/1995 | Soeya et al. | 360/113 |
| 5,436,778 | 7/1995 | Lin et al. | 360/113 |
| 5,461,527 | 10/1995 | Akiyama et al. | 360/113 |
| 5,508,866 | 4/1996 | Gill et al. | 360/113 |
| 5,528,440 | 6/1996 | Fontana et al. | 360/113 |
| 5,549,978 | 8/1996 | Iwasaki et al. | 428/692 |
| 5,561,368 | 10/1996 | Dovek et al. | 324/252 |
| 5,574,605 | 11/1996 | Baumgart et al. | 360/113 |
| 5,608,593 | 3/1997 | Kim et al. | 360/113 |

OTHER PUBLICATIONS

Pal, L. et al., "Magnetic Structures and Phase Transformations in Mn–Based CuAu–I Type Alloys", *Journal of Applied Physics*, vol. 39, No. 2, Feb. 1, 1968, pp. 538–544.

Menshikov, A.Z. et.al., "Magnetic State of Iron–Nickel–Manganese Alloys", *Sov. Phys. JETP*, vol. 44, No. 2, Aug. 1976, pp. 341–344.

Westwood, W.D. et al., *Tantalum Thin Films*, Academic Press, London, 1975, pp. 19–25.

Menshikov, A.Z. et al., "Exchange Interaction and Magnetic Properties of Iron–Nickel–Manganese Alloys", *Journal of Magnetism and Magnetic Materials*, 1975, pp. 91–97.

Lin, Tsann et al., "Improved Exchagne Coupling Between Ferromagnetic Ni–Fe and Antiferromagnetic Ni–Mn–based Films", *Appl. Phys. Lett.*, vol. 65, No. 9, Aug. 29, 1994, pp. 1183–1185.

Tsang, Ching, "Magnetics of Small Magnetoresistive Sensors (Invited)", *J. Appl. Phys.*, vol. 55, No. 6, Mar. 15, 1984, pp. 2226–2231.

*Primary Examiner*—Jefferson Evans
*Attorney, Agent, or Firm*—Knobbe, Martens, Olson & Bear, LLP

[57] ABSTRACT

A magnetoresistive (MR) transducer is disclosed in which an exchange coupled anisotropy field is provided by an antiferromagnetic NiMn alloy in contact with the MR alloy. Improved exchange coupling is achieved using an MR layer and adjacent NiMn exchange coupling layer which have substantially fcc structure and a preferred {111} crystalline orientation. The exchange bias field is observed to correlate strongly with the structural order of the films. A preferred method of fabricating the MR transducer enhances the structural order of the layers during growth, thereby reducing a post-deposition anneal typically required in such processes. The preferred fabrication process further provides greater predictability and control over the resulting exchange coupling.

29 Claims, 6 Drawing Sheets

EXCHANGE BIASED MAGNETORESISTIVE TRANSDUCER

FIELD OF THE INVENTION

The present invention relates generally to thin film magnetic transducers. More particularly, the present invention pertains to thin film magnetoresistive (MR) sensors in which an improved antiferromagnetic film provides an exchange coupled bias field in the ferromagnetic MR film of the sensor.

BACKGROUND OF THE INVENTION

A magnetoresistive (MR) sensor detects an external or applied magnetic field through electrical resistance changes of a magnetic material of high permeability, such as permalloy. There has been substantial interest in the application of MR sensors as read elements in magnetic recording systems for a number of reasons. In contrast to conventional inductive read heads, MR sensors are parametric devices, wherein the signal output scales with the applied sense current. Since the magnitude of the sense current is limited primarily by thermal and electromigration considerations, MR sensors offer the possibility of achieving relatively large signal-to-noise ratios. Also, in contrast to inductive read heads, which are flux variation sensors (d$\phi$/dt), the MR sensor is a flux sensing device ($\phi$), and thus has an output which is independent of the relative sensor-medium velocity. Furthermore, thin film technology allows MR sensors to be easily incorporated into existing head arrangements and to be made small enough to provide good linear density resolution. These features render MR elements especially attractive in higher density magnetic recording systems.

For effective application of MR sensing in magnetic recording, two basic magnetic issues have been addressed. The first issue is that the magnetoresistive effect produces a nonlinear sensor response; therefore, provisions such as a transverse bias field are desirable to obtain a sufficient level of linearity in signal response. Specifically, a transverse bias field is commonly used to shift the operating point of the MR sensor away from a low sensitivity quiescent condition. Transverse biasing may be accomplished in a variety of ways, among them shunt biasing, soft film biasing, permanent magnet biasing, and "Barber Pole" conductors. A general review of the principles of operation of MR sensors in magnetic recording is provided by C. Tsang in "Magnetics of Small Magnetoresistive Sensors," *J. Appl. Phys*, Vol. 55(6), 2226, 1984.

The second issue, particularly for small MR sensors desirable for high density applications, is that of noisy response due to magnetic domain activity or so-called Barkhausen noise. Magnetic materials having high permeability desirable for MR sensing, such as permalloy, often have complicated magnetic domain configurations. Indeed, for small MR sensors, the resulting demagnetization field strongly favors a multi-domain configuration. Barkhausen noise originates from domain wall nucleation and motion inside the magnetically soft material comprising the MR head in response to an external field, for example, from a magnetic recording medium. Reduction of the demagnetization field reduces the likelihood of domain occurrence, but does not guarantee the single domain state. A longitudinal bias field (HBL) is commonly used and must be large enough to cancel the demagnetization field of the resulting single domain. Methods for generating a longitudinal bias field include the use of Barber Pole conductor patterns, hard magnetic biasing, and exchange coupled biasing, the mechanism exploited by the present invention. Exchange coupled biasing is advantageous for miniaturization and avoiding use of applied magnetic fields in the pole tip region.

Broadly speaking, magnetic exchange coupling is fundamentally a consequence of quantum mechanical exchange interactions on an atomic or molecular level. It is generally acknowledged that magnetic exchange interactions, and their associated exchange coupled material systems, reflect a delicate balance between structural, chemical, and the electronic properties of the constituent materials. From a practical point of view, exchange coupled multilayer systems offer the possibility of creating magnetic structures and materials not normally found in bulk or naturally occurring materials. In particular, the exchange coupling between an antiferromagnetic film and an adjacent ferromagnetic film, such as an MR sensor, can induce a unidirectional anisotropy field ($H_{UA}$) experienced by the ferromagnetic film, which is observed as an overall shift of the field-dependent magnetization hysteresis loop.

In an MR transducer, an antiferromagnetic layer deposited adjacent to the permalloy MR layer can create an interfacial exchange interaction that results in an effective uniaxial anisotropy field $H_{UA}$ experienced by the permalloy layer, thereby preventing closure domain formation. U.S. Pat. No. 4,103,315 by Hempstead, et al., incorporated by reference herein, discloses an MR sensor which utilizes antiferromagnetic-ferromagnetic exchange coupling to provide a uniaxial anisotropy field or longitudial bias in the MR element of a sensor. The exchange coupling between the antiferromagnetic and ferromagnetic layers results in a substantially single domain state in the ferromagnetic layer (the MR element), thereby suppressing Barkhausen noise associated with the domain activity. In particular, Hempstead, et al., discloses an MR sensor in which permalloy ($Ni_{80}Fe_{20}$) serves as the ferromagnetic MR layer and a manganese (Mn) alloy with iron (Fe) serves as the antiferromagnetic exchange bias layer (Fe:Mn~1:1).

The exchange coupling between the antiferromagnetic FeMn film and the adjacent permalloy MR layer induces a unidirectional anisotropy field $H_{UA}$ of approximately 30 to 50 Oe in the permalloy layer. Hempstead, et al., reports that the anisotropy field occurs when the $\gamma$-phase of the Mn alloy is stabilized, such phases having a face-centered-cubic (fcc) structure. Hempstead, et al., suggests that the $\gamma$-phase FeMn film is stabilized by fcc-structured underlayers such as NiFe or Cu films. Hempstead, et al., also suggests that alloys of manganese with cobalt, copper, germanium, nickel, and rhodium may produce a stable $\gamma$-phase manganese alloy when deposited on an appropriately structured underlayer. It is well known, however, that the properties of magnetic thin films vary dramatically with composition and preparation conditions. Thus, whether other $\gamma$-phase films can be fabricated to produce useful exchange coupled layers generally cannot be determined a priori.

Two problems encountered with the use of FeMn as the antiferromagnetic exchange coupled bias layer in MR sensors are its corrosive tendencies and the temperature sensitivity of the unidirectional anisotropy field $H_{UA}$. In order to reduce the temperature sensitivity of $H_{UA}$, the deposited FeMn/NiFe layers have been annealed for 20 to 50 hours at a temperature ranging from 260° C. to 350° C. Significant interdiffusion occurs at the interface between the layers with such extended annealing, causing the formation of a ternary NiFeMn interfacial film. The annealed film provides a much greater $H_{UA}$ (approximately 48 Oe) at the MR sensor operating temperature of 80° C., and furthermore exhibits a blocking temperature at which $H_{UA}$ goes to zero, beyond the Neel temperature for bulk FeMn (about 220° C.). The interdiffusion, however, substantially decreases the magnetic moment of the MR sensor material.

As-deposited antiferromagnetic cobalt-terbium (CoTb) and iron-terbium (FeTb) films have also been found to exchange couple to an NiFe film. Exchange bias fields of more than 100 Oe have been obtained with these materials. The exchange coupling observed in these films is very temperature dependent and also dependent upon preparation conditions. For example, after one anneal cycle, the exchange field decreases considerably. Furthermore, the CoTb and FeTb films are relatively corrosive.

Considering the technical difficulties associated with the prior art films, new films exhibiting high antiferromagnetic exchange coupling and relative temperature insensitivity are highly desirable. Other candidates include antiferromagnetic Mn-based alloys having an ordered CuAu-I-type structure (face-centered tetragonal or fct), such as NiMn, IrMn, PdMn, PtMn, and RhMn alloys.

Recently U.S. Pat. No. 5,315,468 by Lin, et al., incorporated herein by reference, discloses an MR sensor having an antiferromagnetic fct NiMn layer for exchange biasing the MR element. U.S. Pat. No. 5,315,468 and a subsequent article by T. Lin, D. Mauri, N. Staud, C. Hwang, J. K. Howard, and G. L. Gorman, *Appl. Phys. Lett.*, Vol. 65, No. 9, 29 Aug. 1994, pp. 1183–85 disclose the preparation and use of an exchange coupled antiferromagnetic NiMn alloy, apparently comprising a substantially θ-phase or fct structure. The observed unidirectional anisotropy field is correlated with the formation of the fct structure upon vacuum annealing at pressures of approximately $10^{-5}$ torr and temperatures of approximately 240°–260° C. The annealing was carried out in cycles, each being approximately 5 to 7 hours with a 17-hour cool-down period. Improved anisotropy fields required at least two such anneal cycles. It is shown by X-ray diffraction that for an isolated NiMn film, such anneal cycles promote growth of the fct phase from the as-deposited, primarily mixed fcc and fct textured film.

According to Lin, et al., an important difference between the prior FeMn and the reported NiMn films is that the FeMn film can exhibit antiferromagnetism and the consequent exchange coupling, even with a more disordered structure. Lin, et al., further suggests that the θ-phase NiMn film is highly ordered and strongly connected with antiferromagnetism. Furthermore, previous studies of bulk NiMn alloys show the existence of an antiferromagnetic θ-phase after annealing to temperatures as high as 800° C. Lin, et al., also shows that the as-deposited NiMn film exhibits an fcc structure having both {111} and {002} textures and further suggests that the NiMn fcc structured film is most likely associated with the paramagnetic or nonmagnetic disordered phase.

While satisfying a need for an antiferromagnetic exchange coupled bias layer, the fct NiMn film tends to require a large amount of preparation in terms of post deposition annealing. Considering these recent developments, it would be highly desirable to produce a magnetoresistive sensor having the desirable properties of an NiMn antiferromagnetic exchange bias layer, but using a simpler, more cost-effective process.

SUMMARY OF THE INVENTION

One aspect of the present invention is a magnetoresistive transducer having an enhanced exchange coupled uniaxial anisotropy field advantageous for suppressing Barkhausen noise. Another object of the present invention is a magnetoresistive transducer including an exchange bias field resulting from an interlayer exchange coupling between an antiferromagnetic NiMn alloy in direct contact with a ferromagnetic NiFe alloy. Yet another aspect of the present invention is a simpler, more cost effective process for fabricating thin film magnetoresistive transducers having exchange coupled bias fields.

In accordance with one aspect of the present invention, a magnetoresistive transducer having an exchange coupled bias field for suppressing Barkhausen noise includes a layer of antiferromagnetic material in direct atomic contact with a layer of ferromagnetic magnetoresistive material. The magnetoresistive material comprises a NiFe alloy having a substantially fcc crystallographic structure and the antiferromagnetic material includes a NiMn alloy also having a substantially fcc crystalographic structure. Furthermore, the crystallographic orientation of the magnetoresistive layer and the antiferromagnetic layer are substantially similar, both having a preferred {111} orientation with respect to the layer normal.

The exchange coupled magnetoresistive layer is preferably incorporated into a multilayer structure including a magnetically permeable adjacent layer underlying the magnetoresistive layer, and further including a nonmagnetic spacer layer disposed between the adjacent layer and the magnetoresistive layer. The exchange bias layer is preferably segmented into two portions, each overlaying the end portion of the magnetoresistive layer. Electrical contact is made to the end portions of the magnetoresistive layer by a conductive layer deposited in respective portions thereon.

In accordance with another aspect of the present invention, a preferred magnetoresistive transducer is fabricated by a process including depositing a permeable adjacent layer onto a base shield or substrate followed by depositing a nonmagnetic spacer layer of substantially β-phase Ta alloy over the adjacent layer. The spacer layer is then desirably conditioned for subsequent layer deposition by sputtering and/or ion milling. The magnetoresistive layer comprising an fcc NiFe alloy film is deposited over the spacer layer under preferred conditions which enhance a {111}-oriented fcc crystallographic structure. Such preferred conditions include biasing the substrate to a predetermined electrostatic potential during deposition. In preparation for depositing the exchange bias layer, a portion of the magnetoresistive layer is desirably removed and redeposited to reduce contaminates which may otherwise attenuate the exchange coupling. The antiferromagnetic NiMn exchange bias layer is deposited under conditions which allow substantially complete growth in a {111}-oriented fcc phase. Subsequent anneal steps are reduced in comparison to prior art processes because the present as-deposited bilayer exhibits substantially compatible structural order. Upon only moderate post anneal, enhanced interlayer exchange coupling is correlated with increased structural order.

In accordance with yet another aspect of the present invention, a preferred magnetoresistive transducer includes a magnetically permeable adjacent layer preferably including an alloy of Ni, Fe and Cr deposited on a base shield or other such substrate. A nonmagnetic spacer layer comprising a substantially β-phase Ta alloy is deposited over the adjacent layer. The spacer layer forms a preferred substrate for the magnetoresistive layer comprising a NiFe alloy film having an approximate composition of 72 to 88 atomic percent of Ni and a thickness preferably less than 40 nm. The magnetoresistive film has a preferred {111}-oriented fcc structure and a thickness preferrably greater than about 25 nm. The antiferromagnetic exchange bias layer comprising a NiMn alloy is deposited over at least a portion of the magnetoresistive layer, thereby inducing a uniaxial anisotropy field in the magnetoresistive layer. The exchange bias layer is deposited and post annealed such that it exhibits a substantially {111}-oriented fcc structure, and a grain size preferably greater than about 25 nm. A conductive layer is deposited to make electrical contact with the end portions of the magnetoresistive layer.

In accordance with yet another aspect of the present invention, a method of fabricating an exchange biased magnetoresistive transducer comprises the following steps: 1) depositing a magnetically permeable adjacent layer onto a substrate, 2) depositing a nonmagnetic spacer layer over the adjacent layer, 3) depositing a ferromagnetic magnetoresistive layer over the spacer layer, wherein the magnetoresistive layer exhibits a predetermined crystallographic structure and orientation, 4) exchanging the topmost portion of the magnetoresistive layer by removing and redepositing material, thereby influencing morphological and chemical conditions of the topmost portion in preparation for depositing the antiferromagnetic exchange bias layer, 5) depositing the antiferromagnetic exchange bias layer over at least a portion of the magnetoresistive layer, thereby inducing an exchange coupled anisotropy field, wherein the exchange bias layer exhibits a predetermined crystallographic structure and orientation substantially equivalent to the crystallographic structure and orientation of the magnetoresistive layer, and 6) annealing the magnetoresistive layer and the exchange bias layer at a predetermined temperature for a predetermined time, thereby increasing structural order and enhancing interlayer exchange coupling.

In a preferred method of fabrication, the step of depositing the spacer layer comprises sputter depositing a substantially β-phase Ta alloy film having a minimum thickness of about 10 nm, and further comprising a step of removing a topmost portion of the spacer layer in preparation for depositing the magnetoresistive layer. The step of depositing the magnetoresistive layer preferably comprises sputter depositing, in the presence of an external magnetic field, a substantially face-centered cubic NiFe alloy film having an approximate composition of 72 to 88 atomic percent of Ni and a film thickness less than 40 nm, wherein the magnetoresistive layer has a substantially {111} crystallographic orientation. Furthermore, the step of depositing the exchange bias layer preferably comprises sputter depositing a substantially face-centered cubic NiMn alloy film having an approximate composition of 45 to 55 atomic percent Ni and a film thickness of at least 25 nm, wherein the exchange bias layer has a substantially {111} crystallographic orientation. Another aspect of a preferred method of fabrication comprises annealing the magnetoresistive layer and the exchange bias layer to a temperature of about 250° C. to 300° C. for a period of up to 10 hours.

DETAILED DESCRIPTION OF THE PREFERRED EMBODIMENTS

Figure 1:
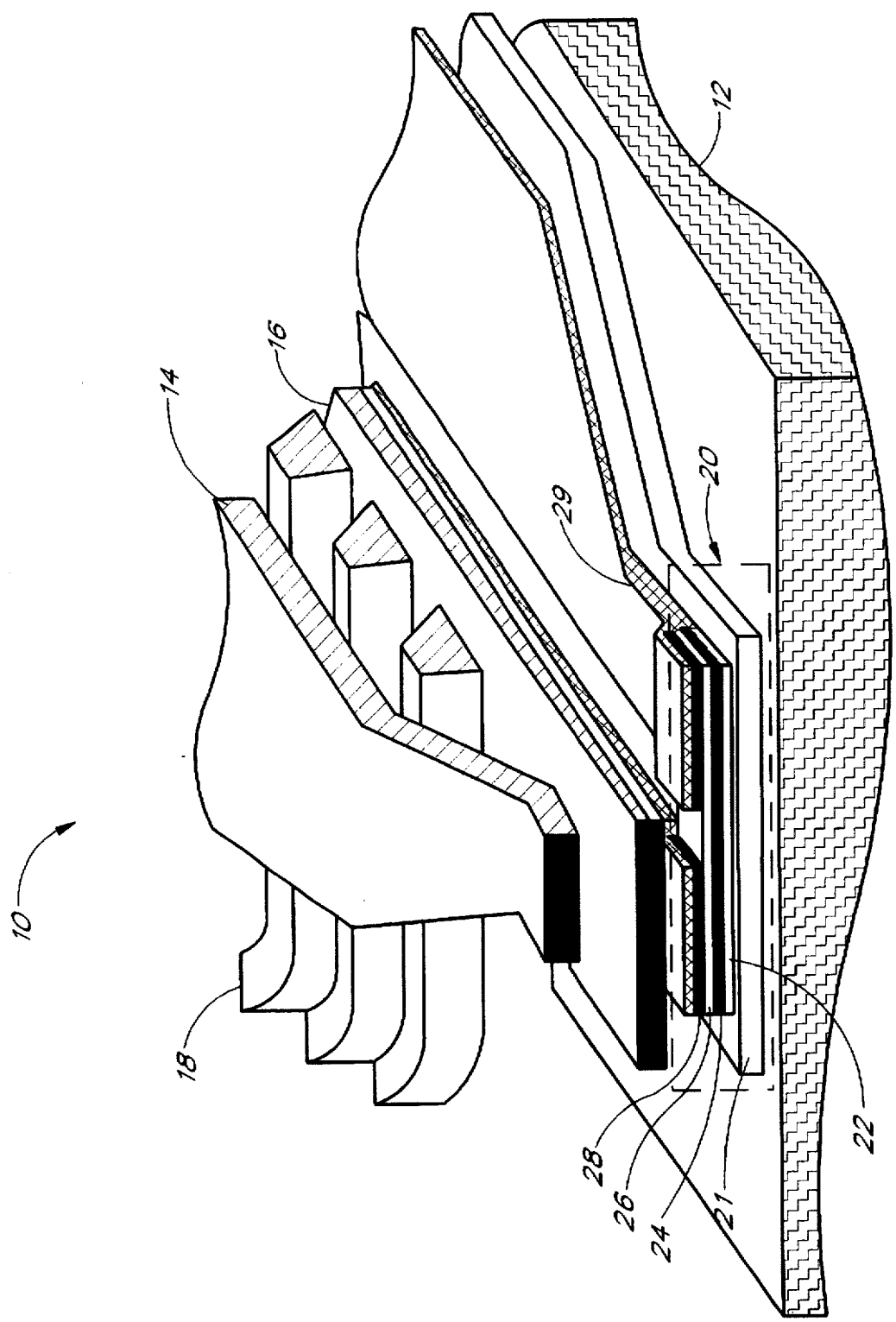
FIG. 1 is simplified perspective view of a composite thin film magnetoresistive/inductive magnetic read/write head.

Although the present invention is described as embodied in a magnetic disk thin film read/write head as shown in FIG. 1, it would be apparent that the invention is also applicable to other magnetic recording systems such as a magnetic tape data storage system, and in general for applications requiring sensitive magnetic field detection.

As shown in FIG. 1, preferred embodiments of the magnetoresistive transducers are advantageously incorporated into thin film magnetic recording heads. The read/write head 10 is shown here in simplified perspective illustrating the relative position and orientation of the MR read sensor with respect to the inductive write transducer and slider body 12. In general, a combination head such as shown in FIG. 1 may comprise a thin film inductive write head having an induction coil 18, an upper pole 14, and a merged lower pole and magnetic shield 16. In accordance with the present invention, a thin film magnetoresistive (MR) read head 20 is advantageously incorporated between the magnetic shield 16 and slider body 12 of the thin film recording head 10. In general, a magnetoresistive read head 20 comprises a bottom magnetic shield 21 upon which is deposited a magnetically permeable layer or so-called soft adjacent layer (SAL) 22. A nonmagnetic, preferably resistive, spacer layer 24 is deposited over the SAL 22. A MR layer 26 typically comprised of thin film of permalloy or other soft magnetic material is deposited over the spacer layer 24. The exchange bias layer 28 is deposited over the MR layer 26, preferably in two portions, each portion overlaying an end portion of the MR layer 26, providing a small gap near the center of the read head 20, having a gap width preferably less than the read track width. A nonmagnetic electrical lead layer 29 is deposited directly over the exchange coupling layer, thereby supplying electrical current conduction to the end portions of the MR transducer 20.

In use, the head assembly 10 is positioned in close proximity to a magnetic recording medium (not shown) whereby the transducer elements in the head impress or sense localized regions of magnetization in the recording medium, interpreted as magnetic "bits" of information. The write process comprises information that is supplied to the write portion of the combination head 10 in the form of an electrical signal. The signal is passed through the induction coil 18. Ensuing magnetic induction in the permalloy pole pieces results in a magnetic flux emanating from the pole gap and thereby penetrating the magnetic recording media, causing local magnetization of the recording medium.

Figure 2:
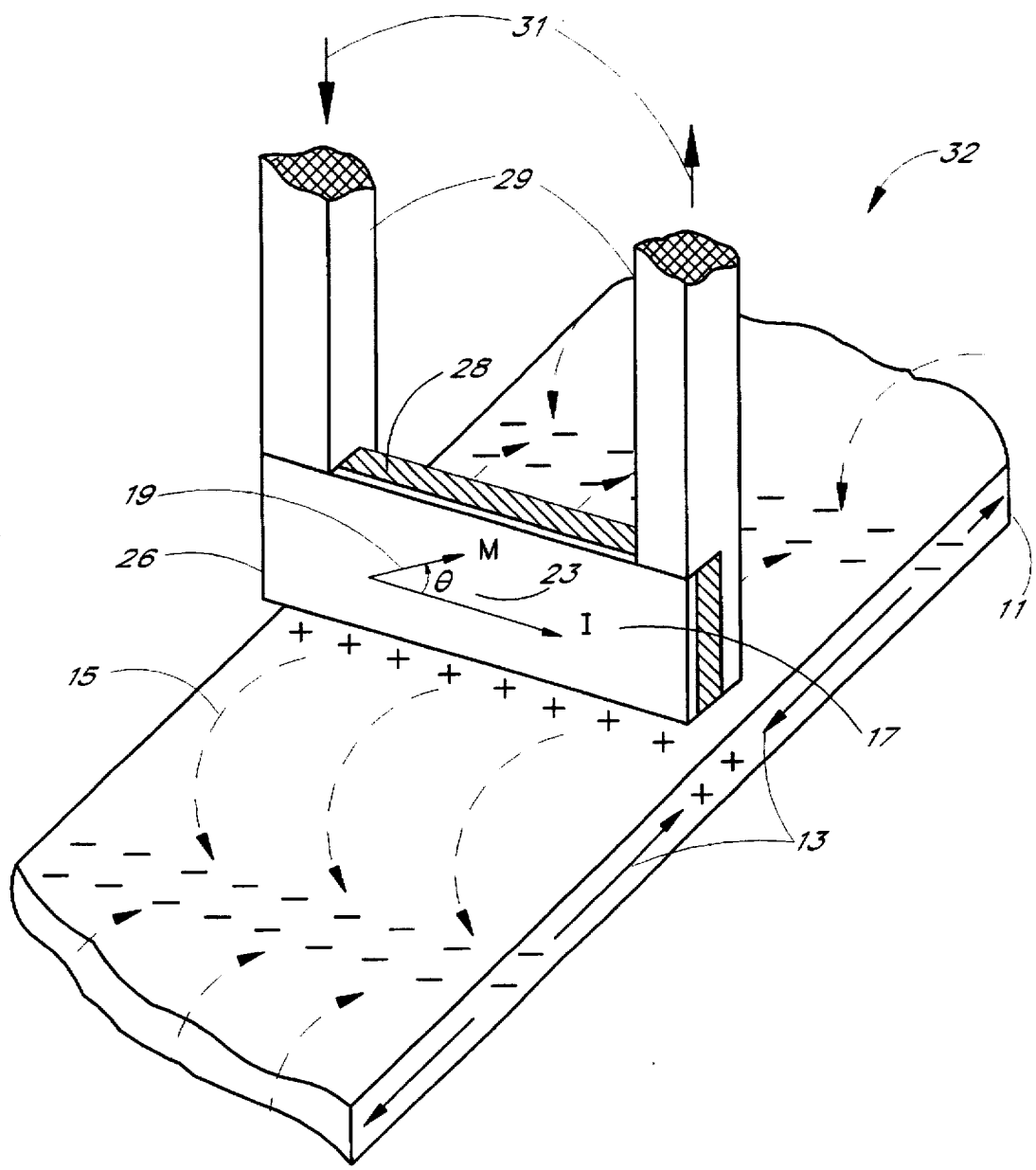
FIG. 2 is a schematic perspective view illustrating the operation of an MR read head.

The read process using is illustrated schematically in FIG. 2 using a simplified MR transducer 32. After a write process, the magnetic storage medium 11 contains locally magnetized regions 13 whose magnetization direction may vary in accordance with the information impressed by the write head. In particular, a localized region of substantially uniform magnetization, a so-called magnetic bit, is detected by the MR transducer, whose electrical output corresponds to the direction of magnetization, and is generally configured to represent digital information. Magnetized regions of the recording medium 13 give rise to magnetic fields 15 in regions outside of the material, which fields are to be sensed or read by the MR transducer 32. The MR layer 26 is typically a thin film of permalloy having a magnetization vector (M) 19 aligned parallel to the film plane and in general oriented at an angle θ with respect to the sense current direction 17. A sense current 32 is provided through leads 29, causing a current to flow through the magnetoresistive element 26 along the sense current direction 17. In accordance with the magnetoresistive effect, the magnetoresistance of a material varies as:

$$\delta\rho = \delta\rho_{max}\cos^2\theta \quad (1)$$

where δρ is the magnetoresistance change with respect to the maximum value $\delta\rho_{max}$ and θ is the relative angle between the MR material magnetization and the direction of the sense current. Thus, a change in the magnetization vector M of the MR layer 26 causes a change in the resistance of the MR transducer 20.

As mentioned previously, Barkhausen noise in the MR layer 26 represents a principal limitation to the operation of an MR transducer. To eliminate Barkhausen noise, the MR layer 26 may be maintained in a single domain state by providing an exchange bias layer 28 in direct contact with at least a portion of the MR element. Furthermore, as outlined above, a preferred exchange bias layer 28 comprises an antiferromagnetic layer producing an exchange coupled bias field. Two principal characteristics desirable for a preferred antiferromagnetic exchange coupled layer are a high uniaxial anisotropy field $H_{UA}$ and relative temperature insensitivity of the uniaxial anisotropy field $H_{UA}$.

Figure 3:
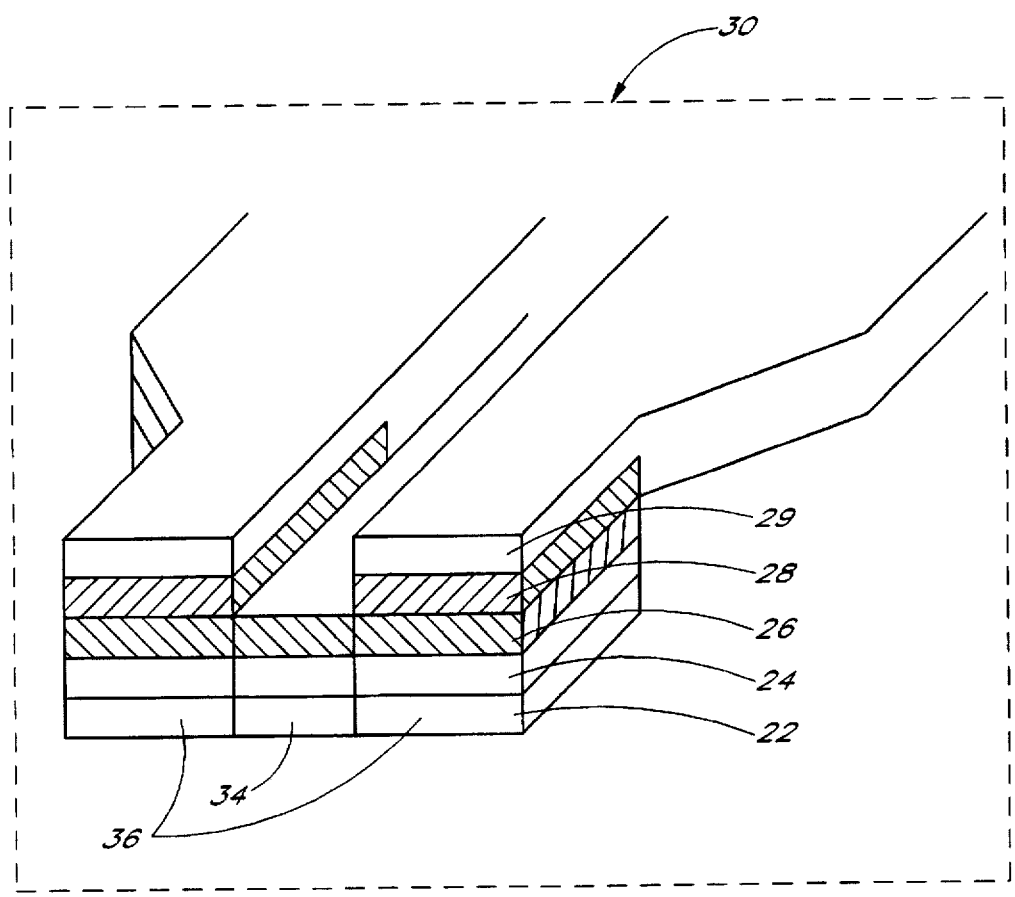
FIG. 3 is a schematic perspective of a preferred exchange biased magnetoresistive sensor in accordance with the present invention.

As shown in FIG. 3, a preferred embodiment of a magnetoresistive transducer 30 in accordance with the principles of the present invention comprises a multi-layered thin film structure having the basic functional characteristics set forth in the preceding discussion. In particular, a preferred thin film MR transducer 30 comprises a bottom magnetic shield or other suitable substrate (not shown) upon which is deposited a soft adjacent layer (SAL) 22, a nonmagnetic spacer layer 24, a MR layer 26, an exchange bias layer 28, and electrically conducting lead layers 29. The SAL 22 may comprise an NiFeCr alloy or other such permeable material suitable as a magnetic shield. The spacer layer 24 is preferably comprised of a β-phase Ta layer having a thickness of at least 10 nm and more preferably up to 30 nm or greater. The MR layer 26 is generally comprised of a high permeability magnetic thin film such as permalloy. In the embodiments herein disclosed, an alloy comprising $Ni_xFe_{1-x}$, where x is approximately 0.8 (with a 10% tolerance) is used for the MR layer 26 having a thickness in the range of 20 to 50 nm. As disclosed in greater detail below, the MR layer should have a crystallographic structure and orientation conducive to a high degree of exchange coupling with the overlaying antiferromagnetic exchange bias layer.

To ensure that the MR layer 26 experiences an exchange coupled uniaxial anisotropy field, the adjacent exchange bias layer 28 is deposited in direct contact with the MR layer 26, whereby their mutual interfacial structural and magnetic properties induce an exchange interaction. In accordance with the present invention, a preferred exchange bias layer 28 comprises an antiferromagnetic alloy of Mn and Ni, in approximately equal proportions, having an ordered γ-phase or fcc-type structure. The resulting interfacial exchange coupling to the ferromagnetic MR layer 26, induces an exchange bias field. The exchange bias field thereby produces a single domain state in the MR layer, and suppresses domain wall state transitions, otherwise common in permeable magnetic materials. A comprehensive description of prior art magnetoresistive transducers in which the antiferromagnetic layer may be a γ-phase of Mn and Fe is provided in the above-referenced U.S. Pat. No. 4,103,315.

Hempstead, et al., disclosed the use of γ-phase FeMn alloys for the antiferromagnetic exchange biasing layer. A preferred embodiment describes a γ-phase FeMn alloy deposited on an fcc-structured underlayer. While it is suggested that other gamma phase Mn alloys may be used for substantially the same purpose, no specific information is provided to enable suitable fabrication of other γ-phase films. More recently, the MR sensor disclosed in U.S. Pat. No. 5,315,468 utilizes an antiferromagnetic exchange bias layer comprising an NiMn alloy in a so-called θ-phase or fct-type structure (face-centered tetragonal). In order to fabricate thin films of fct NiMn alloy, Lin, et al., teaches that NiMn films should preferably be annealed at temperatures of approximately 250° C. for a plurality of anneal cycles, with the best results using typically from 2 to 4 anneal cycles.

In accordance with the principles of the present invention, it is found that an NiMn antiferromagnetic alloy having an fcc structure, a preferred crystalline orientation, and a preferred range of average grain size can produce an exchange coupling to an NiFe magnetoresistive film. In accordance with the present invention, the preferred properties are, in particular, an fcc-structured NiMn film having a preferred orientation in the {111} crystallographic direction, a grain size preferably larger than about 25 nm, and a thickness preferably larger than about 25 nm. In a preferred embodiment of the present invention, a permeable magnetoresistive film such as permalloy or other such magnetically permeable alloy is deposited as a thin film on a Ta underlayer using sputter deposition techniques in a manner producing a well-ordered {111}-oriented fcc layer. The preferred antiferromagnetic fcc NiMn {111}-oriented layer is deposited over the MR layer, providing intimate interfacial contact conducive to a high-degree of exchange coupling.

Figure 4:
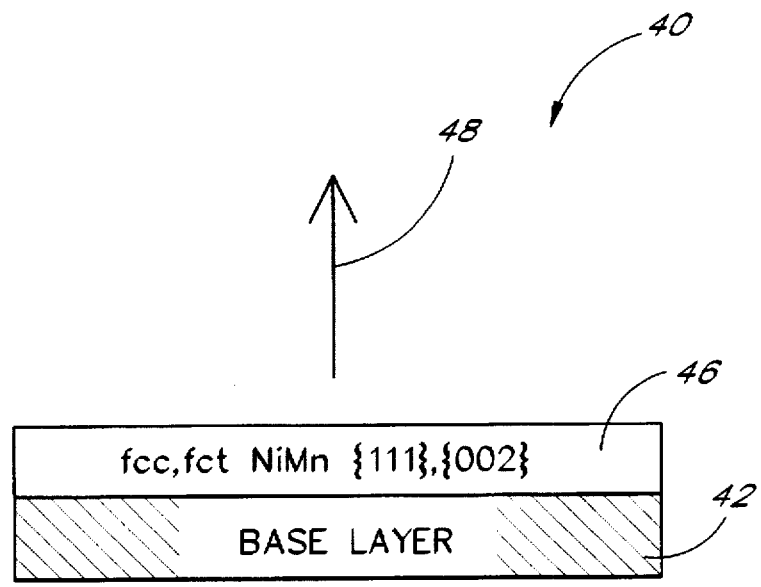
FIG. 4 is a schematic cross-section of an NiMn thin film multilayer structure.
Figure 5:
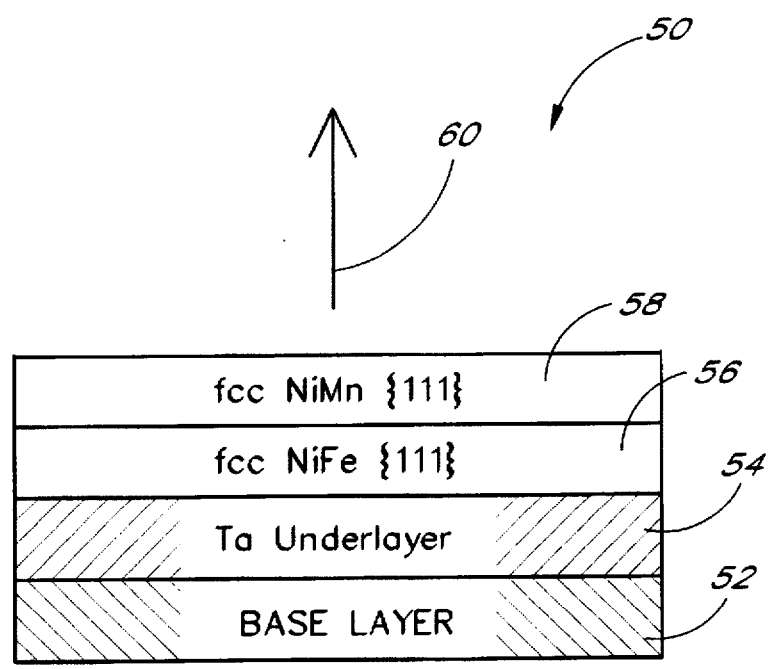
FIG. 5 is a schematic cross-section of an NiMn/NiFe multilayer structure.

Furthermore, in accordance with the present invention, the MR and NiMn layers are deposited on a Ta layer by sputter deposition techniques well known in the art. In particular, DC magnetron and RF diode sputtering techniques are used to sputter NiFe and NiMn targets to produce the MR and exchange bias layers, respectively. In general, the deposition parameters for sputtering these materials, such as pressure, power, and bias voltage of the substrate may vary in accordance with the deposition system used. However, as described in more detail below, there are preferred fabrication steps which produce MR transducers having improved structural order and interfacial exchange coupling. As a revealing comparison of the growth behavior of sample antiferromagnetic NiMn films, they were prepared in two ways: 1) NiMn layer deposited on an aluminum oxide ($Al_2O_3$) or silicon dioxide ($SiO_2$) underlayer, as depicted in FIG. 4; and 2) NiMn deposited on a preferred NiFe layer, in accordance with the present invention, as depicted in FIG. 5.

The multilayer structures produced in the above-described manner are characterized structurally by X-ray diffraction and magnetically by vibrating sample magnetometry and a B-H Looper. Standard X-ray diffraction techniques augmented by Grazing Incidence X-Ray Diffraction (GIXD), as well as X-ray rocking curves, show that the NiMn films deposited on $Al_2O_2$ or $SiO_2$ showed substantial amounts of θ-phase (fct) NiMn having a {002} crystallographic orientation. As illustrated in FIG. 4, an NiMn film 46 deposited directly on $Al_2O_3$ or $SiO_2$ base layer 42 is observed to have both fct and fcc structures, with {111} and {002} crystallographic orientations with respect to the film normal 48. By comparison, as shown in FIG. 5, a preferred multilayer construction comprises a base layer 52, which may be $Al_2O_3$ or $SiO_2$, upon which is deposited a Ta underlayer 54 as described earlier. An NiFe layer 56 is deposited over the Ta layer 54 whereby the NiFe layer exhibits a substantially fcc structure having a substantially {111} crystallographic orientation with respect to the film normal 60. The preferred NiMn film 58 is deposited over the NiFe layer 56, as further depicted in FIG. 5, wherein the dominant fcc structure of the NiMn layer 58 is accompanied by a preferred {111} crystallographic orientation. X-ray and electron microprobe analysis show that the NiMn films deposited on fcc NiFe are substantially only γ-phase (fcc) with a {111} orientation. No trace of θ-phase (fct) NiMn was found by either X-ray or electron microprobe analysis. In accordance with the present invention, a preferred exchange bias layer comprises an NiMn layer 58 deposited on the NiFe layer 56 such that the NiMn layer 58 attains a substantially fcc structure and displays a substantially {111} crystallographic orientation.

Recently, the coexistence of two phases of an NiMn thin film is reported in an article by T. Lin, D. Mauri, N. Staud, C. Hwang, J. K. Howard, Applied Physics Letters, Vols. 65 (9), 29 Aug. 1994, p. 1183–85. It is reported that an NiMn film deposited on aluminum oxide ($Al_2O_3$) exhibits mixed phases having both {111} and {002} textures. Lin, et al., further suggests that the fcc structure is associated with a paramagnetic (or nonmagnetic) disordered phase. Upon annealing, the NiMn film is reported to reorder into a predominantly fct structure in contrast to the preferred fcc structure of the present invention.

Hence, in contrast to the prior art NiMn films, a preferred embodiment of the present invention comprises an NiMn film deposited on a well-ordered NiFe film. Under these preferred conditions, the NiMn film attains an ordered fcc structure having a {111} preferred orientation. It is believed that the growth behavior of the NiMn layer 58 is strongly influenced by the structure and orientation of the NiFe underlayer 56. It is furthermore observed that desirable exchange coupling with the NiFe film depends sensitively on the interfacial growth and structural properties.

Referring back to FIGS. 1 and 3, more particularly, in a preferred magnetoresistive head and fabrication process, the substrate 21 upon which the MR and exchange bias layers are deposited may comprise a bottom magnetic shield or other substrate material such as $Al_2O_3$. The SAL 22, comprising a magnetically permeable material such as a NiFeCr alloy, is deposited on the substrate 21, usually by conventional sputter deposition techniques. A nonmagnetic spacer layer 24 is deposited over the SAL 22, preferably comprising at least in part a β-phase Ta alloy. The β-phase of Ta is advantageous because of its relatively high resistivity, thereby suppressing sense current flow through the spacer layer 24 and the SAL 22 during operation of the transducer. The spacer layer 24, comprised of the β-phase Ta, is also usually deposited by conventional DC or RF sputter deposition techniques, generally characterized by a vacuum base pressure of about $5\times10^{-7}$ Torr, a noble gas partial pressure of about 10 to 20 μm, and a plasma power input of about 1 kW, producing a deposition rate of about 5 nm/min. Residual oxygen is preferably incorporated into the Ta matrix within the limits established by the residual chamber pressure and Ta deposition rate. The Ta layer thickness should be at least 10 nm and preferably about 30 nm. Following deposition, a preferred process comprising ion milling and sputter etching serves to condition the Ta spacer layer 24 prior to subsequent deposition. It is believed that the ion milling and sputter etching steps help to clean and smooth the Ta surface by removing the topmost nonuniformities and contamination. The Ta spacer layer preparation herein disclosed has been found to enhance the fcc {111} orientation of the subsequently deposited NiFe layers. While the Ta spacer layer 24 provides a preferred underlayer for growth of the NiFe MR layer 26, it is noted that other materials and process steps may be employed to obtain a preferred NiFe layer having substantially all fcc structure and {111} orientation.

The NiFe MR layer 26 is deposited on the spacer layer 24 in a manner which enhances the fcc structure and preferred {111} orientation. A preferred method of NiFe deposition comprises DC or RF sputter deposition using an $Ni_{81}Fe_{19}$ target. The relative proportion of Ni:Fe is about 4:1 within a range of 10%. The base layers (SAL and spacer layer) are electrically biased to about 50V during NiFe deposition. Application of such bias has been found to maintain a cleaner surface during deposition by virtue of relatively mild cosputtering. This procedure has been found to further enhance the fcc NiFe {111} orientation. The permalloy layer is grown to a thickness in the range of 10 to 40 nm at a deposition rate of about 10 nm/min in the presence of an applied magnetic field of about 80 Oe. Deposition is typically accomplished with a base vacuum pressure of about $5\times10^{-7}$ Torr, a noble gas partial pressure in the range of 3 to 20 μm, and an input plasma power of about 1 kW.

These advantageous conditions are further enhanced through a preferred process step comprising removing and redepositing about 5 nm of the NiFe layer prior to the NiMn deposition. This steps helps to eliminate contaminated NiFe resulting from intervening photo-patterning steps. With clean, freshly deposited NiFe replacing the topmost contaminated NiFe layers, the ensuing fcc NiMn {111} layer 28 is better ordered with a higher exchange coupling to the fcc NiFe layer 26. This enhancement may be understood by virtue of a cleaner, well-ordered interface promoting higher interfacial exchange coupling.

The exchange bias layer 28 comprising antiferromagnetic NiMn alloy is deposited on at least a portion of the the MR layer 26, following the aforementioned redeposition of NiFe on the MR layer 26. Deposition of the NiMn exchange bias layer 28 is accomplished by sputter deposition using an $Ni_{50}Mn_{50}$ target to produce a film having substantially equal proportions of Ni and Mn. The relative proportions of Ni:Mn may vary within a range of about 10%. The conditions for sputter deposition are substantially similar to those of preceding process steps. The NiMn deposition rate is preferably about 3 nm/min, and the layer thickness is preferably greater than about 25 nm. It should be noted, however, that since the exchange coupling is principally an interfacial effect, it is possible to use NiMn layers less than 30 nm thick, provided there is sufficient anisotropy field to drive the MR layer into a substantially single domain state.

X-ray studies show that NiFe films grown on Ta have the preferred fcc structure with a high degree of preferred {111} preferred orientation as compared to, for example, NiFe deposited directly on $Al_2O_3$. Furthermore, the inventors have observed that the fcc NiFe {111} x-ray scattering peak intensity correlates with the resulting exchange bias field observed in the completed structure. In accordance with the present invention, the deposition of NiMn on top of the fcc NiFe will nucleate and grow the preferred fcc NiMn layer 26 having a high degree of {111} orientation. Thus, in a preferred embodiment of an MR head and fabrication process, the growth of NiFe on a specially prepared Ta surface is used to promote the growth of fcc NiFe with a high degree of {111} orientation. The crystalline structure and orientation of NiFe, in effect, forms a preferred nucleation surface for the growth of fcc NiMn {111}; thereby providing a substrate conducive to ordered growth and consequent large exchange interaction.

From the perspective of process control in the fabrication of magnetoresistive heads, it is shown that NiFe MR thin films grow on a Ta underlayer having a preferred fcc structure with a predominantly {111} orientation. This is advantageous for the subsequent deposition of the NiMn exchange bias layer, where now NiMn is deposited to form a substantially fcc structure with the {111} preferred orientation, as a result of interactions with the NiFe underlayer. Hence, it is possible to predict the ensuing exchange coupling on the basis of prior process steps. It is believed that the substantially commensurate crystal structure between the NiFe layer and the NiMn layer provides suitable basis for the formation of a large exchange interaction. From the point of view of reliability, it is anticipated that the deposition and post anneal of the NiMn on NiFe film is easier to control, because the crystal structure and preferred orientation is enhanced without changing the crystalline phase or orientation.

In practice, the as-deposited NiMn film displays an fcc structure with preferred {111} orientation, but the anisotropy field produced by the as-deposited film may be relatively low. However, a preferred film fabrication process also comprises a film annealing step by which the degree of order in the fcc phase is increased, while maintaining a predominantly {111} orientation. It is observed that upon annealing at approximately 250° C. to 300° C. for a period in the range of 1 to 10 hours following the previously described deposition of the NiMn film, the {111} X-ray diffraction intensity substantially increases, indicating a greater degree of ordering in the fcc phase. Compared to prior art films, the present anneal step represents a significant reduction in process time and cost.

Figure 6:
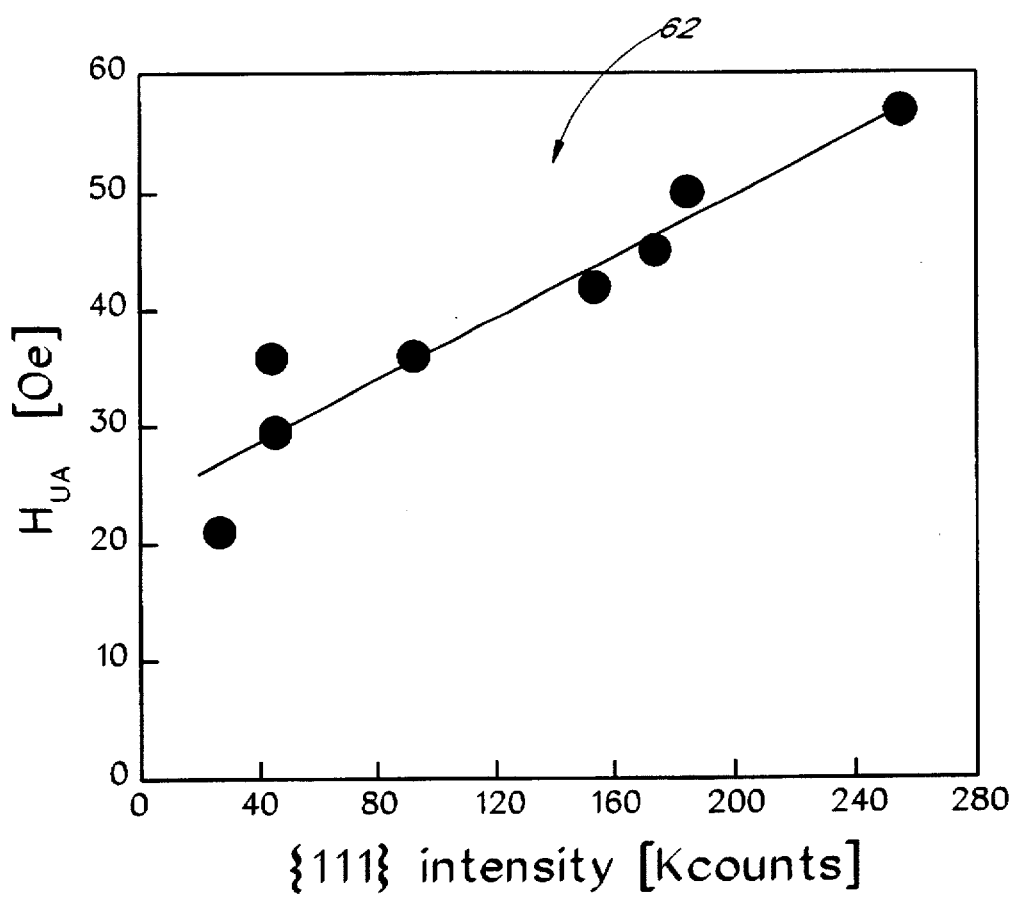
FIG. 6 shows a plot of the unidirectional anisotropy field as a function of the {111} X-ray diffraction intensity.

Correlated with the increased {111} peak in the X-ray diffraction intensity is a substantial increase in the resulting uniaxial anisotropy field. As shown in FIG. 6, the uniaxial anisotropy field $H_{UA}$ is strongly correlated with the {111} diffraction peak intensity 62. Hence, as a result of only moderate annealing, the increased film order is associated with substantial increase of the anisotropy field $H_{UA}$. Increased structural order at the interface between the NiFe layer and the NiMn layer should contribute substantially to the increased exchange coupling. In this respect, the demands on the degree of reordering during the anneal are considerably reduced because the films already exhibit similar structure and orientation. This behavior is consistent with the expectation that good interfacial exchange coupling is promoted by surfaces having a high degree of correlation in crystal structure and orientation.

The average film grain size is a measure of the length over which the crystalline structure is preserved without misorientation or realignment. Typically, the average grain size is also measured by X-ray diffraction. Table I below shows a representative behavior of the average grain size with the anneal time, indicating that an anneal of only 6 hours can yield a grain size increase from 25 nm to 26.2 nm. Table I also shows the uniaxial anisotropy fields associated with the various anneal times, indicating the uniaxial anisotropy field increases rapidly upon anneal.

TABLE I

| Anneal Time (hours) | Average Grain Size (nanometers) | $H_{UA}$ |
|---|---|---|
| 0 | 25 | 4.8 |
| 1 | 25.8 | 43.3 |
| 2 | 25.9 | 54.7 |
| 4 | 25.8 | 51.5 |
| 6 | 26.2 | 65.4 |

Figure 7:
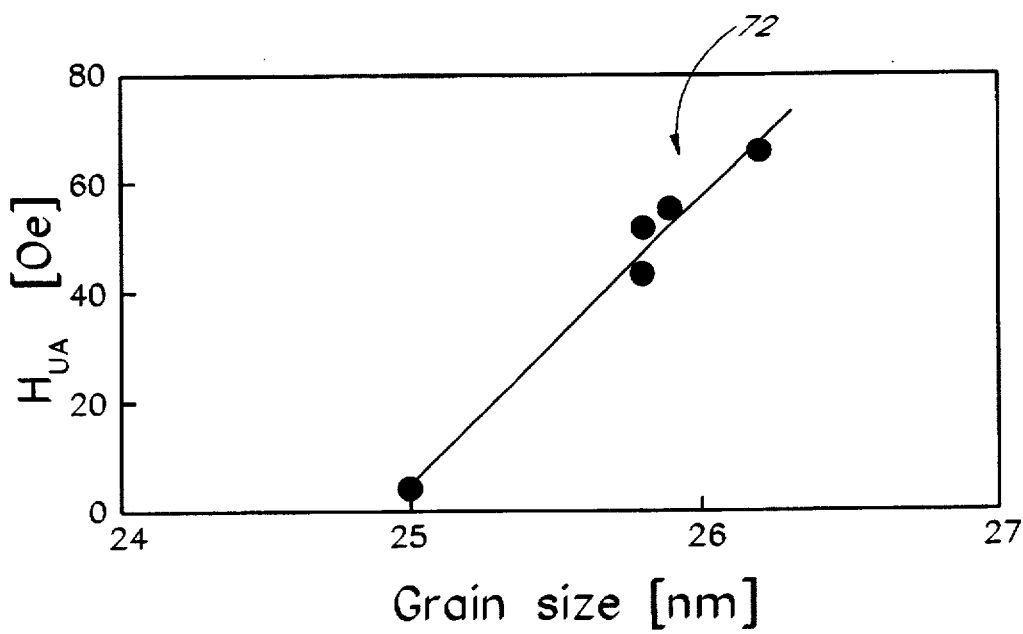
FIG. 7 shows a plot of the unidirectional anisotropy field as a function of the average grain size of the annealed film.

Summarizing the data shown in Table I, FIG. 7 shows that the grain size of the as-deposited film is approximately 25 nm and upon anneal grows to over 26 nm. Additionally, as shown in FIG. 7, a correlation of the uniaxial anisotropy field with the average crystalline grain size 72 indicates that a higher exchange coupling is present with larger grain size.

A significant advantage offered by the present invention is the relatively short anneal time required to attain an acceptable degree of exchange coupling. Also, the desired exchange coupling is reproducibly attained because it largely depends upon the degree of structure prepared beforehand in the NiFe underlayer.

Figure 8:
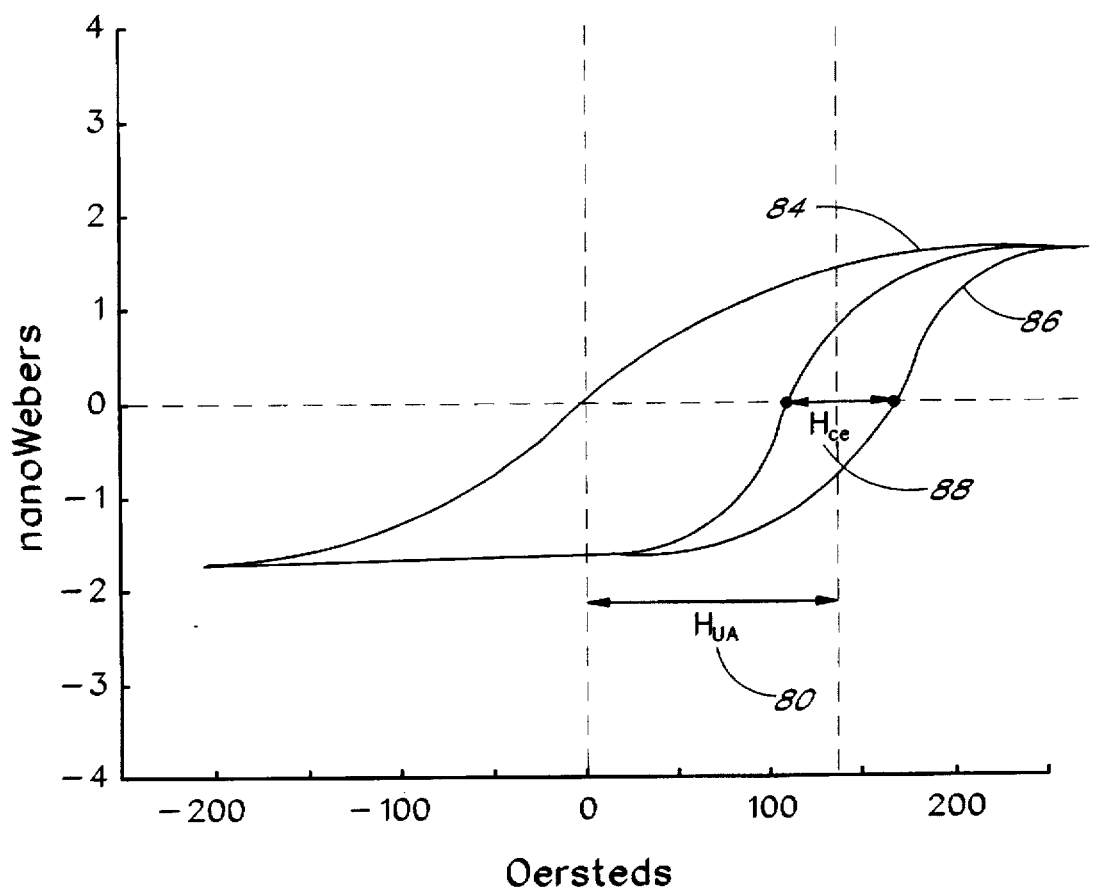
FIG. 8 shows a hard and easy axis hysteresis loop for an exchanged-biased magnetoresistive sensor in accordance with the present invention.

In accordance with the preferred embodiments of a antiferromagnetic NiMn film deposited on a ferromagnetic NiFe film, such an arrangement is shown to be advantageous for the purposes of exchange biasing a permeable magnetoresistive film. As shown in FIG. 8, the bilayer comprising NiMn antiferromagnetic layer deposited on the NiFe ferromagnetic layer displays magnetic properties favorable for domain suppression and magnetoresistive response. In particular, curves 84 and 86 show the hard and easy axis magnetization behavior of a preferred bilayer. Curve 84 illustrates the hard axis magnetization behavior, showing little or no hysteresis and thus no remanent domain nucleation in the hard axis direction. On the other hand, curve 86 shows the easy axis magnetization behavior or so-called "IB-H" loop, the hysteresis of which indicates nearly complete magnetization reversal. The uniaxially anisotropy field $H_{UA}$ 80 is approximately 140 Oe, indicated by the shift of the B-H loop along the H (Oe) axis. The coercive field $H_{ce}$, indicated by the double-ended arrow 88, is smaller than $H_{UA}$, as desired for a sensitive magnetoresistive transducer. Thus, in a preferred embodiment of an exchange biased magnetoresistive film, the fcc phase of NiMn deposited directly on an fcc phase of NiFe performs advantageously to provide an exchange bias field of about 140 Oe.

While preferred embodiments of this invention have been disclosed herein, those skilled in the art will appreciate that changes and modifications may be made therein without departing from the spirit and scope of the invention as set forth in the appended claims.

We claim:

1. A magnetoresistive transducer having an exchange coupled bias field provided by a layer of antiferromagnetic material in direct atomic contact with a layer of ferromagnetic magnetoresistive material, wherein the ferromagnetic material comprises a NiFe alloy having a substantially face-centered cubic (fcc) crystallographic structure, wherein the antiferromagnetic material comprises a NiMn alloy having a substantially fcc crystallographic structure, and wherein the uniformity of a {111} crystallograhic orientation of the NiMn layer is sufficient to produce a uniaxial anisotropy field of at least 20 Oersteds.

2. The magnetoresistive transducer of claim 1, further comprising a spacer layer underlying the magnetoresistive layer, the spacer layer comprising a substantially β-phase Ta alloy.

3. The magnetoresistive transducer of claim 2, wherein the spacer layer has a thickness of at least 10 nm.

4. The magnetoresistive transducer of claim 3, further comprising a magnetically permeable adjacent layer underlying the spacer layer.

5. The magnetoresistive transducer of claim 4, wherein the magnetically permeable adjacent layer comprises an alloy of Ni, Fe and Cr.

6. The magnetoresistive transducer of claim 5, further comprising conducting layers in electrical contact with opposing end portions of the magnetoresistive layer.

7. The magnetoresistive transducer of claim 1, wherein the magnetoresistive layer comprises a film having a thickness of less than 40 nm.

8. The magnetoresistive transducer of claim 1, wherein the antiferromagnetic layer comprises a film having a thickness of at least 25 nm.

9. The magnetoresistive transducer of claim 1, wherein the antiferromagnetic layer comprises a polycrystalline film having an average grain size of at least 25 nm.

10. The magnetoresistive transducer of claim 1, wherein the antiferromagnetic layer comprises a composition within a range of about 45 to 55 atomic percent of Ni.

11. The magnetoresistive transducer of claim 1, wherein the magnetoresistive layer comprises a composition within a range of about 72 to 88 atomic percent of Ni.

12. The magnetoresistive transducer of claim 1, wherein the magnetoresistive layer comprises a ferromagnetic film having a coercive field less than the exchange coupled bias field.

13. The magnetoresistive transducer of claim 1, wherein the exchange coupled bias field is directed parallel to the magnetoresistive layer.

14. An exchange biased magnetoresistive transducer fabricated by a process comprising the steps of:
  a. depositing a magnetically permeable adjacent layer on a substrate;
  b. depositing a nonmagnetic spacer layer on the magnetically permeable spacer layer;
  c. depositing a ferromagnetic magnetoresistive layer on the spacer layer;
  d. exchanging a topmost portion of the magnetoresistive layer by removing and redepositing material, thereby removing contaminated ferromagnetic material so as to influence morphological and chemical conditions of the topmost portion of ferromagnetic material in preparation for depositing an antiferromagnetic exchange bias layer having an enhanced exchange coupling with the ferromagnetic layer;
  e. depositing the exchange bias layer in direct atomic contact over at least a portion of the magnetoresistive layer;
  f. depositing conductive layers in electrical contact with opposing end portions of the magnetoresistive layer; and
  g. annealing the exchange bias layer and the magnetoresistive layer at a predetermined temperature for a predetermined time, thereby enhancing interlayer exchange coupling.

15. The exchange biased magnetoresistive transducer of claim 14 wherein the step of depositing the adjacent layer comprises sputter depositing an alloy comprising Ni, Fe and Cr.

16. The exchange biased magnetoresistive transducer of claim 14, wherein the step of depositing the spacer layer comprises sputter depositing Ta and codepositing oxygen to produce β-phase Ta alloy having a thickness of at least 10 nm.

17. The exchange biased magnetoresistive transducer of claim 14, further comprising a step of morphologically and chemically conditioning the spacer layer in preparation for the step of depositing the magnetoresistive layer, said conditioning step comprising at least removing surface contaminants from a topmost portion of the spacer layer.

18. The exchange biased magnetoresistive transducer of claim 17, wherein the step of conditioning the spacer layer comprises one or both of sputtering and ion milling the topmost portion of the spacer layer.

19. The exchange biased magnetoresistive transducer of claim 18, wherein the step of depositing the magnetoresistive layer further comprises applying a predetermined substrate bias voltage during sputter deposition.

20. The exchange biased magnetoresistive transducer of claim 14, wherein the step of depositing the magnetoresistive layer comprises sputter depositing, in the presence of an external magnetic field, a ferromagnetic NiFe alloy having a composition of about 72 to 88 atomic percent of Ni to produce a permeable ferromagnetic magnetoresistive film having a thickness of less than 40 nm and a substantially {111}-oriented face-centered cubic crystallographic structure.

21. The exchange biased magnetoresistive transducer of claim 14, wherein the step of exchanging a topmost portion of the magnetoresistive layer comprises removing material from the magnetoresistive layer by one or both of sputtering and ion milling and sputter depositing material over the magnetoresistive layer, thereby influencing morphological and chemical conditions of the topmost portion in preparation for depositing an antiferromagnetic exchange bias layer.

22. The exchange biased magnetoresistive transducer of claim 14, wherein the step of depositing the exchange bias layer comprises sputter depositing an antiferromagnetic NiMn alloy having a composition of about 45 to 55 atomic percent of Ni to produce an antiferromagnetic film having a thickness of at least 25 nm, a substantially {111}-oriented face-centered cubic crystallographic structure and an average grain size of at least 25 nm.

23. The exchange biased magnetoresistive transducer of claim 14, wherein the step of annealing comprises heating the magnetoresistive layer and the exchange bias layer to a temperature of about 250° C. to 300° C. for a period of up to 10 hours, thereby increasing interfacial structural order, characterized by enhanced interlayer exchange coupling.

24. A magnetoresistive transducer having an exchange coupled bias field comprising:
  a layer of magnetoresistive ferromagnetic material comprising a NiFe alloy having a substantially face-centered cubic (fcc) crystallographic structure, and a substantially predetermined crystallographic orientation of substantially {111} with respect to a direction normal to the layer;
  a layer of antiferromagnetic material comprising a NiMn alloy in direct atomic contact with said layer of ferromagnetic magnetoresistive material and having a substantially fcc crystallographic structure, and a substantially predetermined crystallographic orientation of substantially {111} with respect to a direction normal to the layer;
  a spacer layer underlying said magnetoresistive layer comprising substantially β-phase Ta alloy with a thickness of at least 10 nm; and,
  a magnetically permeable adjacent layer underlying said spacer layer comprising an alloy of Ni, Fe, and Cr.

25. The magnetoresistive transducer of claim 24, further comprising conducting layers in electrical contact with opposing end portions of the magnetoresistive layer.

26. A magnetoresistive transducer having an exchange coupled bias field provided by a layer of antiferromagnetic material in direct atomic contact with a layer of ferromagnetic magnetoresistive material, wherein the ferromagnetic material comprises a NiFe alloy having (1) a substantially face-centered cubic (fcc) crystallographic structure and (2) a substantially predetermined crystallographic orientation, wherein the antiferromagnetic layer comprises a film overlaying at least a portion of the magnetoresistive layer and has (1) a crystallographic orientation substantially similar to the crystallographic orientation of the magnetoresistive layer, and (2) comprises a polycrystalline film having an average grain size of at least 25 nm.

27. An exchange biased magnetoresistive transducer fabricated by a process comprising the steps of:

a. depositing a magnetically permeable adjacent layer on a substrate;

b. depositing a nonmagnetic spacer layer on the magnetically permeable adjacent layer by sputter depositing Ta and codepositing oxygen to produce β-phase Ta alloy having a thickness of at least 10 nm;

c. depositing a ferromagnetic magnetoresistive layer on the spacer layer;

d. exchanging a topmost portion of the magnetoresistive layer by removing and redepositing material, thereby influencing morphological and chemical conditions of the topmost portion in preparation for depositing an antiferromagnetic exchange bias layer;

e. depositing the exchange bias layer in direct atomic contact over at least a portion of the magnetoresistive layer;

f. depositing conductive layers in electrical contact with opposing end portions of the magnetoresistive layer; and g. annealing the exchange bias layer and the magnetoresistive layer at a predetermined temperature for a predetermined time, thereby enhancing interlayer exchange coupling.

28. An exchange biased magnetoresistive transducer fabricated by a process comprising the steps of:

a. depositing a magnetically permeable adjacent layer on a substrate;

b. depositing a nonmagnetic spacer layer on the magnetically permeable adjacent layer;

c. depositing a ferromagnetic magnetoresistive layer on the spacer layer by sputter depositing, in the presence of an external magnetic field, a ferromagnetic NiFe alloy having a composition of about 72 to 88 atomic percent of Ni to produce a permeable ferromagnetic magnetoresistive film having a thickness of less than 40 nm and a substantially {111}-oriented face-centered cubic crystallographic structure;

d. exchanging a topmost portion of the magnetoresistive layer by removing and redepositing material, thereby influencing morphological and chemical conditions of the topmost portion in preparation for depositing an antiferromagnetic exchange bias layer;

e. depositing the exchange bias layer in direct atomic contact over at least a portion of the magnetoresistive layer;

f. depositing conductive layers in electrical contact with opposing end portions of the magnetoresistive layer; and g. annealing the exchange bias layer and the magnetoresistive layer at a predetermined temperature for a predetermined time, thereby enhancing interlayer exchange coupling.

29. An exchange biased magnetoresistive transducer fabricated by a process comprising the steps of:

a. depositing a magnetically permeable adjacent layer on a substrate;

b. depositing a nonmagnetic spacer layer on the magnetically permeable adjacent layer;

c. depositing a ferromagnetic magnetoresistive layer on the spacer layer;

d. exchanging a topmost portion of the magnetoresistive layer by removing and redepositing material, thereby influencing morphological and chemical conditions of the topmost portion in preparation for depositing an antiferromagnetic exchange bias layer;

e. depositing the exchange bias layer in direct atomic contact over at least a portion of the magnetoresistive layer by sputter depositing an antiferromagnetic NiMn alloy having a composition of about 45 to 55 atomic percent of Ni to produce an antiferromagnetic film having a thickness of at least 25 nm, a substantially {111}-oriented face-centered cubic crystallographic structure and an average grain size of at least 25 nm;

f. depositing conductive layers in electrical contact with opposing end portions of the magnetoresistive layer; and g. annealing the exchange bias layer and the magnetoresistive layer at a predetermined temperature for a predetermined time, thereby enhancing interlayer exchange coupling.

* * * * *

UNITED STATES PATENT AND TRADEMARK OFFICE
CERTIFICATE OF CORRECTION

PATENT NO. : 5,764,445
DATED : June 9, 1998
INVENTOR(S) : Torng et al.

It is certified that error appears in the above-identified patent and that said Letters Patent is hereby corrected as shown below:

On the title page, Item [73], add "Hitachi Metals Ltd., Chiyoda-Ku, Tokyo, and Applied Magnetics Corporation, Goleta, Calif."

Signed and Sealed this

Thirteenth Day of July, 1999

Attest:

Q. TODD DICKINSON

Attesting Officer

Acting Commissioner of Patents and Trademarks